(12) United States Patent
Rutz

(10) Patent No.: US 6,634,581 B2
(45) Date of Patent: Oct. 21, 2003

(54) FIELD SHREDDER WITH A FRICTION BASE

(76) Inventor: Georg Rutz, Rosenheimer Strasse 26, 85655 Grosshelfendorf (DE), 85655

( * ) Notice: Subject to any disclaimer, the term of this patent is extended or adjusted under 35 U.S.C. 154(b) by 30 days.

(21) Appl. No.: 09/936,641

(22) PCT Filed: Jan. 12, 2001

(86) PCT No.: PCT/EP01/00079
§ 371 (c)(1),
(2), (4) Date: Sep. 12, 2001

(87) PCT Pub. No.: WO01/50840
PCT Pub. Date: Jul. 19, 2001

(65) Prior Publication Data
US 2003/0066918 A1 Apr. 10, 2003

(30) Foreign Application Priority Data
Jan. 12, 2000 (DE) ..................... 200 00 454 U

(51) Int. Cl.⁷ ............................................. B02C 21/02
(52) U.S. Cl. .................. 241/101.742; 241/242
(58) Field of Search ................. 241/221, 242, 241/101.742, 223, 224

(56) References Cited

U.S. PATENT DOCUMENTS 4,312,481 A   1/1982   Carey et al.

FOREIGN PATENT DOCUMENTS

| DE | 2 051 209 | 4/1972 |
| DE | 2 324 996 | 12/1974 |
| DE | 26 42 103 | 4/1978 |
| DE | 93 13 163 | 3/1984 |
| DE | 3316241 | * 11/1984 |
| DE | 34 00 252 | 7/1985 |
| DE | 34 44 502 | 6/1986 |
| DE | 93 13 163.1 | 2/1995 |
| EP | 0 153 621 | 9/1985 |
| EP | 0 538 599 A2 | 4/1993 |
| FR | 2310065 | 11/1976 |
| FR | 2 545 317 | 11/1984 |
| GB | 2 297 502 A | 8/1996 |

OTHER PUBLICATIONS

Minimais Super Mod.27 "R", Mar. 4, 1974, 4 pp.
Garnier u.k. "The Joker", Forage Harvester, Paris 1973, 2 pp.
Jaguar Brochure, Aug., 1994.

* cited by examiner

Primary Examiner—Mark Rosenbaum
(74) Attorney, Agent, or Firm—George W. Neuner; Edwards & Angell, LLP

(57) ABSTRACT

A field shredder comprises a friction base, a housing, a rotatable blade drum provided in the housing and having a rotary axis, and a plurality of blades attached to the blade drum, which cooperate with the friction base to finely chop harvested material. The friction base comprises a plurality of protrusions spaced apart axially and circumferentially. Each of the blades comprises a cutting edge. The protrusions comprise at least two side surfaces having edges formed at an angle with each other and which are both not parallel to the cutting edge of the blade. The plurality of blades comprise a first and a second set of blades, each arranged on one half of the blade drum offset against one another in the direction of rotation of the blade drum and the cutting edge of which are inclined towards the rotary axis of the blade drum.

10 Claims, 3 Drawing Sheets

FIELD SHREDDER WITH A FRICTION BASE

FIELD OF THE INVENTION

The present invention relates to a field shredder with a friction base, with a housing, a rotatable blade drum provided in the housing and a blade attached to the. blade drum, which cooperates with the friction base to finely chop harvested material.

BACKGROUND OF THE INVENTION

Such a field shredder is known from DE 33 16 241 C 2. The friction base comprises a plurality of beams with cutting edges offset in alignment with the circumference and extending vertically to the axis of the drum across the width of the friction base. In such a friction base, there exists the problem that the harvested material jams between the ribs, thus pegging the friction base in such a way that the beams no longer protrude over the effective surface and no friction output exists any more.

A further field shredder with a friction base is known from DE26 42 103. In this field shredder, the friction base comprises a plurality of indentations pushed into metal sheets from the outside to the inside, the steeply climbing partial u of which is aligned with its edge opposite to the orbiting direction of the blade drum, extending vertically to the axis of the drum. The indentations comprise a small distance to one another and are offset in rows. The blade on the blade drum is set at a certain angle to a counter-blade on the friction base. As the base must remain dosed, the cutting edge can, if at all, only protrude upwards by about 4 mm. This small height is very quickly pegged in operation.

Therefore, the object of the invention is to provide a field shredder with a friction base in which the friction base is not pegged.

SUMMARY OF THE INVENTION

This object is solved by a field shredder with a friction base 10, with a housing 6, a rotatable blade drum 7 provided in the housing 6 and a blade 8 attached to the blade drum 7, which cooperates with the friction base 10 to finely chop harvested material, characterized in that the friction base 10 comprises a plurality of protrusions 11 spaced apart axially and circumferentially, the blade 8 comprises a cutting edge 12, the protrusions comprise at least two side surfaces 13, 14 with edges forming an angle with each other and which are both not parallel to the cutting edge 12 of the blade 8, and a first and a second set of blades 8 are provided, each arranged on one half of the blade drum 7 offset against one another in the direction of rotation of the blade drum 7 and the cutting edges of which are inclined towards the rotary axis of the blade drum 7.

As the protrusions which interact with the blades are spaced in an axial direction and in the direction of the circumference, the chopped harvested mat erial can easily exit again between the protrusions, thus pegging less the friction base. As the protrusions comprise two side surfaces interacting with the cutting edge of the blade, the effectively of the chopping activity is increased. This makes it possible for the protrusions to be arranged at a greater distance from one another than if they only comprised one side surface which interacts with the blade. The greater distance of the protrusions improves the cleaning capability, with the result that the friction base tends to be pegged less.

Preferred embodiments of the invention include one or more of the following features: pro-trusions 11 comprising a rectangular cross-section; pro-trusions 11 comprising a square cross-section; protrusions 11 provided in a parallelepiped shape parallel to the rotary axis of the blade drum 7; protrusions 11 comprising a circular or an oval cross-section, with the longitudinal axis of the oval extending parallel to the rotary axis of the blade drum 7; and blades 8 inclined against the rotary axis of the blade drum 7 in such a way that they show a V shape in a top view.

Further features and advantages of the invention result from the following description of embodiments on the basis of the figures.

DETAILED DESCRIPTION OF THE INVENTION INCLUDING THE PREFEREED EMBODIMENT

Figure 1:
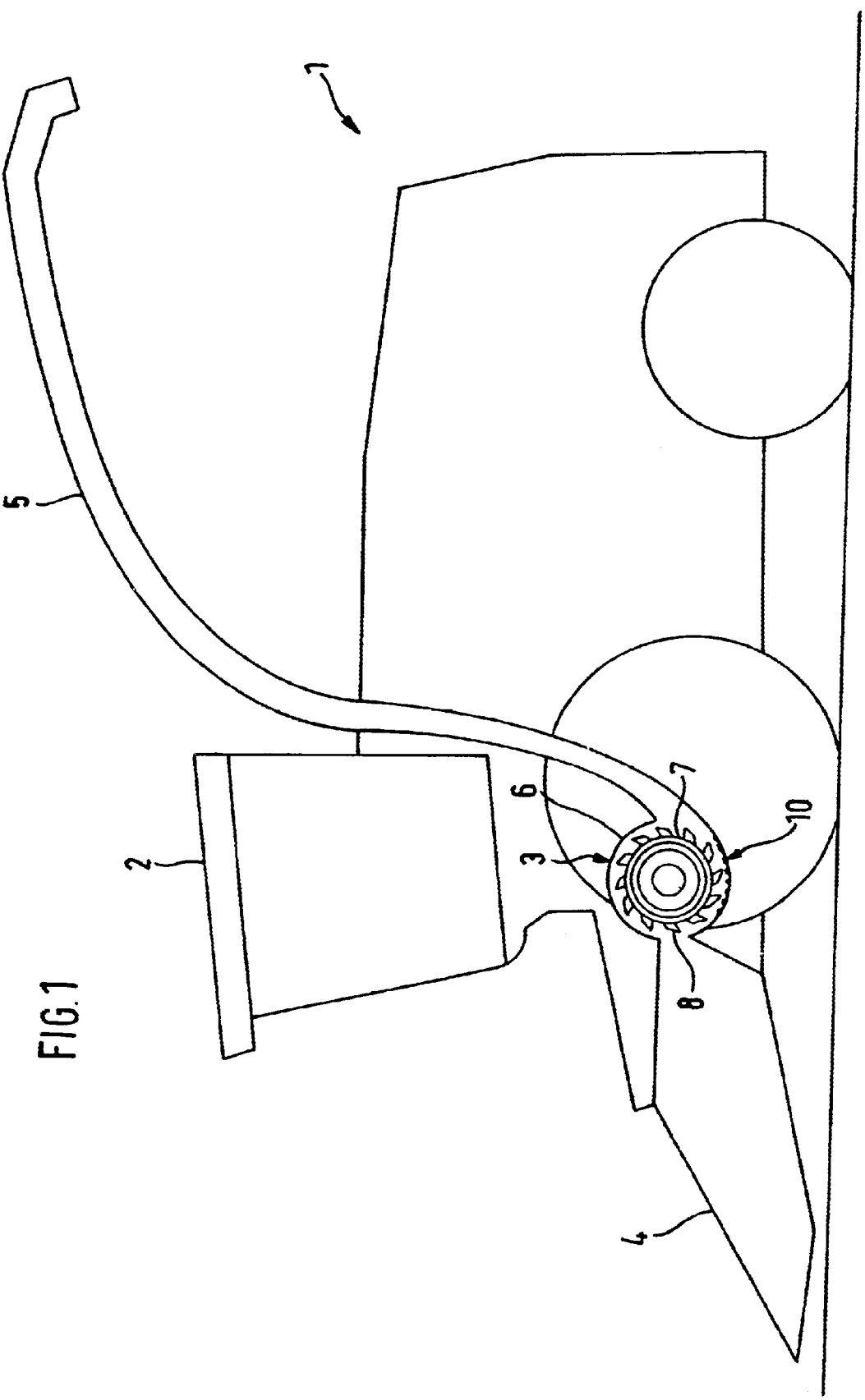
FIG. 1: | a schematic view of a field shredder; |
| FIG. 2. | a housing with a blade drum; and |
|

As is shown in FIG. 1, a field shredder 1 which is selfpropelling is provided in accordance with the present embodiment. The field shredder comprises an assembly with a driver housing 2. In the interior of the field shredder 1, a cutting device 3 is provided. The cutting device 3 is provided with harvested material to be chopped by an inlet housing 4. The chopped harvested material is ejected through an ejector shaft 5.

Figure 2:
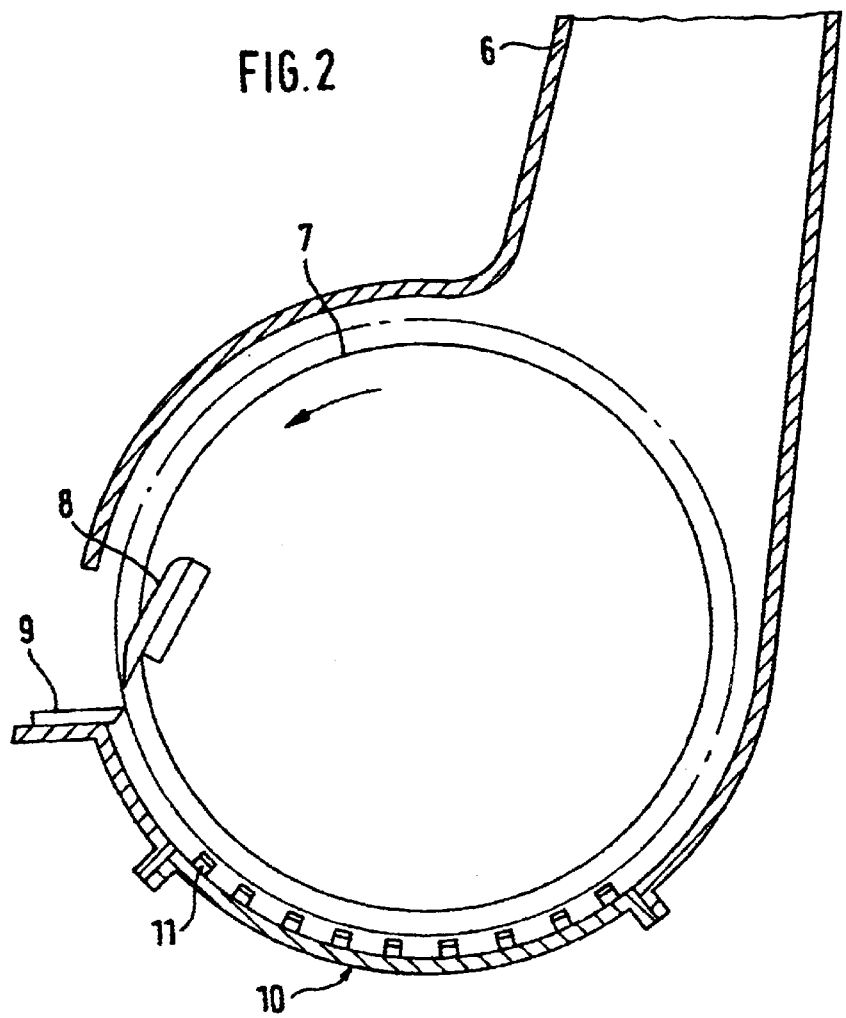

As can be seen best from FIG. 2, the cutting device 3 comprises a housing 6 and a blade drum 7 provided therein and being rotatable. The blade drum 7 is provided with a plurality of blades 8, of which only one is shown in FIG. 2. On the housing 6, a counter—blade 9 is provided, which interacts with blade 8 to chop the harvested material. In the lower part of casing 6, a friction base 10 is arranged, comprising a base 16, onto which a plurality of protrusions has been welded, these also interacting with the blade 8 in order to chop the harvested material. The protrusions comprise limitation walls essentially vertical to the panel and a flat surface.

Figure 4:
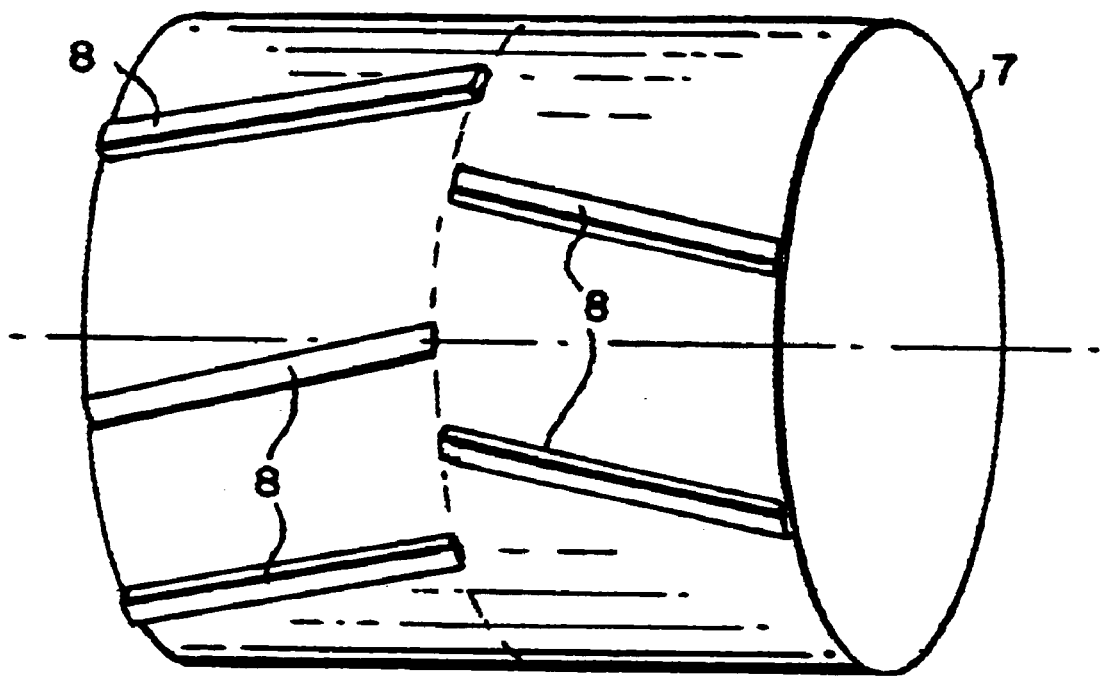

The blade 8 extends continuously oblique to the rotary axis of the blade drum 7 on the circumference of the blade drum 7 (FIG. 4). However, a separation of the blades 8 in an axial direction is preferred. The blades 8 of the one axial section are offset compared with the blades 8 of the other axial section in such a way that the blades 8 create a gap.The blades 8 are inclined towards the rotary axis of the blade drum 7 in such a way that they comprise a V shape in a plane view.

The protrusions 11 cooperating with the blades 8 are arranged parallel to the rotary axis of the blade drum 7 in rows on the friction base 10. The protrusions are arranged in the axial direction spaced apart from one another roughly corresponding to the extent of the protrusions in an axial direction. The protrusions 11 are offset in one row against the protrusions 11 of another row. In this way, diagonal passages are formed between the protrusions 11. The blades 8 are provided inclined in such away that their cutting edge 12 is vertical in the direction of the passages. Then, the cutting edge 12 cooperates with a front surface 13 of the protrusions as seen from the cuttingedge 12, and a sides 14 of the protrusions 11. As a result of the double effect, the harvested material can be chopped and rubbed particularly effectively.

As the protrusions are spaced apart from one another both in an axial direction and also in the direction of the circumference, the blades 8 can push the chopped harvested material out of the cavities between the protrusions 11 well, with the result that negative effects on the friction base 3 are avoided.

Figure 3:
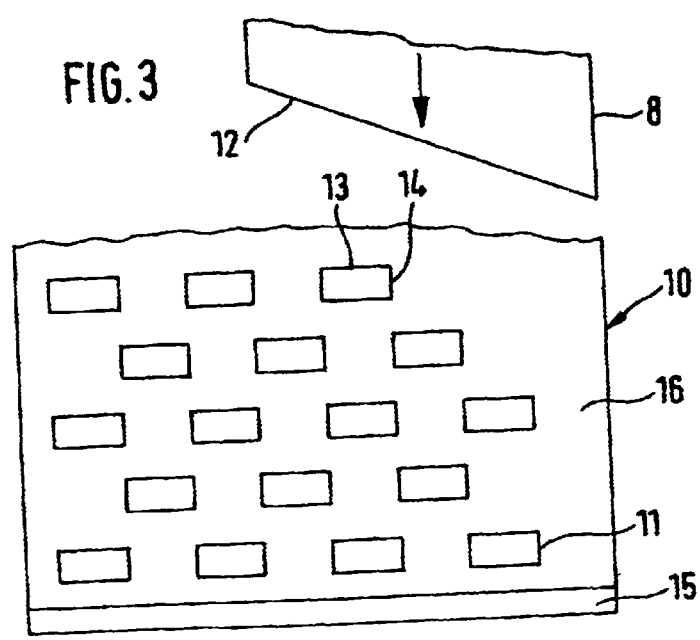
FIG. 3: | a section from the friction base with a first arrangement of protrusions. |
| FIG. 4 | a blade drum illustrating an arrangement o f blades in accord with the invention. |

In the embodiment shown in FIG. 3, the protrusions are in the shape of a parallelepiped. The parallelepiped-shaped protrusions of one row are offset against the parallelepipedshaped protrusions of a neighbouring row. However, the protrusions can be aligned with one another in the direction of the circumference.

In the embodiment shown in FIG. 3, the protrusions are arranged with their cutting edge 14 in the direction of the rotary axis of the blade drum 7. The protrusions can be parallelepiped-shaped and alternatively arranged in rows inclined against the rotary axis of the blade drum 7. If the blades are arranged in a V shape, the parallelepiped-shaped protrusions can also be arranged in the two halves of the friction base with a differing inclination towards the rotary axis of the blade drum 7. It is essential that both side surfaces 13 and 14 and the corresponding cutting edges 12 of the blades 8 are inclined.

In FIG. 3, the protrusions are shown with parallelepiped-shaped cross-sections. However, the protrusions can also have a square cross-section. Further, the protrusions can also comprise a circular or an oval cross-section.

In all the cases, the protrusions, as shown in FIG. 3, can be arranged offset against one another or they can be aligned with each other. In the latter case, the cleaning effect is greatest, as the harvested material can be removed from the passages between the protrusions 11 best of all.

In operation, harvested material is taken in through the inlet housing 4 while the field shredder 1 is moving forwards, fed to the cutting device 3 and chopped by the blades 8 in cooperation with the counter-blade 9 and the protrusions 11 of the friction base 10. Thereafter, it is ejected through the ejector shaft 5 by the rotation of the blade drum 7 in such a way t it can be caught by a container either on the field shredder or in a vehicle travelling alongside. In this, the harvested material is effectively chopped and rubbed.

At the end of the friction base, there is an end bar, which converts the turbulence of the harvested material into a straight flow and thus enables use for corn-cracker rollers without subjecting them to choking.

The protrusions 11 have the form of a parallelepiped or a cube with a height of 10 to 20 mm and preferably 14 to 18 and most preferably approximately 16 mm. The protrusions are welded on the base 16.

What is claimed is:

1. A field shredder comprising:

a friction base;

a housing;

a rotatable blade drum provided in housing and having a rotary axis; and a plurality of blades attached to the blade drum, which cooperate with the friction base to finely chop harvested material;

wherein the friction base comprises a plurality of protrusions spaced apart axially and circumferentially, wherein each of the blades comprise a cutting edge, wherein the protrusions comprise at least two side surfaces having edges formed at an angle with each other and which are both not parallel to the cutting edge of the blade, and wherein the plurality of blades comprise a first set and a second set of blades, each set arranged on one half of the blade drum and offset against one another in the direction of rotation of the blade drum, and wherein the cutting edges of the blades are inclined towards the rotary axis of the blade drum.

2. A field shredder according to claim 1, wherein the blades are inclined toward the rotary axis of the blade drum in such a way that they exhibit a V shape.

3. A field shredder according to claim 1, wherein the protrusions comprise a rectangular cross-section.

4. A field shredder according to claim 3, wherein the blades are inclined toward the rotary axis of the blade drum in such a way that they exhibit a V shape.

5. A field shredder according to claim 3, wherein the protrusions comprise a square cross-section.

6. A field shredder according to claim 5, wherein the blades are inclined toward the rotary axis of the blade drum in such a way that they exhibit a V shape.

7. A field shredder according to claim 3, wherein the protrusions are provided in a parallelepiped shape parallel to the rotary axis of the blade drum.

8. A field shredder according to claim 7, wherein the blades are inclined toward the rotary axis of the blade drum in such a way that they exhibit a V shape.

9. A field shredder according to claim 1, wherein the protrusions comprise a circular cross-section or an oval cross-section with the longitudinal axis of the oval extending parallel to the rotary axis of the blade drum.

10. A field shredder according to claim 9, wherein the blades are inclined toward the rotary axis of the blade drum in such a way that they exhibit a V shape.

* * * * *

UNITED STATES PATENT AND TRADEMARK OFFICE
CERTIFICATE OF CORRECTION

PATENT NO. : 6,634,581 B2
DATED : October 21, 2003
INVENTOR(S) : Rutz

It is certified that error appears in the above-identified patent and that said Letters Patent is hereby corrected as shown below:

<u>Title page,</u>
Item [22], PCT Filed: change "January 12, 2001" to -- January 5, 2001 --.

Signed and Sealed this

Twenty-seventh Day of January, 2004

JON W. DUDAS
*Acting Director of the United States Patent and Trademark Office*